United States Patent [19]

Shirakura et al.

[11] Patent Number: 4,740,980
[45] Date of Patent: Apr. 26, 1988

[54] GAS LASER DEVICE

[75] Inventors: Toshiharu Shirakura, Ibaraki; Hiroyuki Sugawara, Hitachi; Shigeo Shiono, Hitachi; Minoru Suzuki, Hitachi; Humio Shibata, Hitachi, all of Japan

[73] Assignee: Hitachi, Ltd., Tokyo, Japan

[21] Appl. No.: 919,423

[22] Filed: Oct. 16, 1986

[30] Foreign Application Priority Data

Oct. 16, 1985 [JP] Japan ................... 60-230777

[51] Int. Cl.[4] .............................. H01S 3/03
[52] U.S. Cl. ........................ 372/58; 372/61; 372/87; 372/701
[58] Field of Search ............. 372/58, 61, 87, 701

[56] References Cited

U.S. PATENT DOCUMENTS 4,351,052 9/1982 Sasaki et al. ................ 372/58
4,672,621 6/1987 Morita et al. ................ 372/58

FOREIGN PATENT DOCUMENTS 0135701 4/1985 European Pat. Off. ........... 372/58

Primary Examiner—James W. Davie
Assistant Examiner—Xuan Vo
Attorney, Agent, or Firm—Antonelli, Terry & Wands

[57] ABSTRACT

In a gas laser device according to this invention, a gas inlet having an electrode protrudes within each of expanded portions protruding on the side, where the gas inlet is disposed, of the principal portion of the discharge tube. Gas medium ejected from the gas inlet in the principal portion of a discharge tube collides with the inner surface of the principal portion of a discharge tube, while forming a flame extending along the ejected gas medium from the electrode and is divided into two partial flows. One of them flows along the wall of the expanded portion; collides with the gas inlet; and is divided further into two partial flows. Therefore it does not collide with the gas medium within the gas inlet. Consequently the gas medium and the flame fluctuate hardly and are stabilized. In this way it is possible to stabilize the laser output.

9 Claims, 2 Drawing Sheets

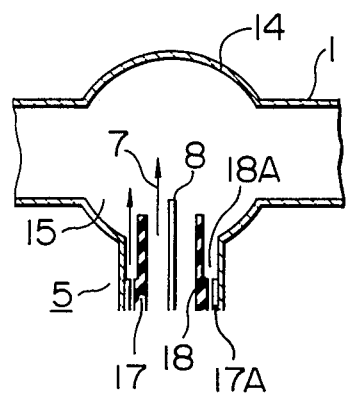
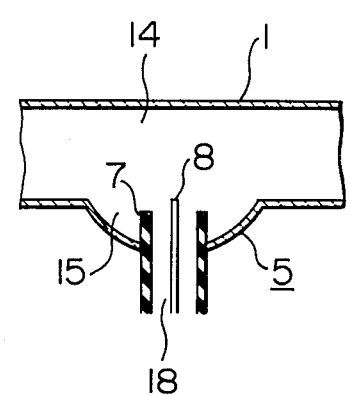
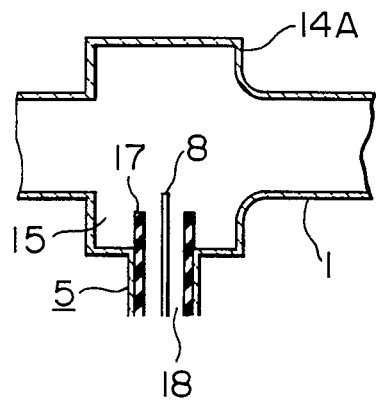
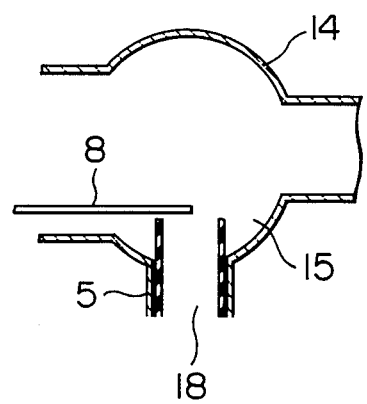

GAS LASER DEVICE

BACKGROUND OF THE INVENTION

This invention relates to a gas laser device, in which the neighborhood of the gas inlet for feeding its principal discharge portion with gas flow is improved.

Recently a small size and high power high speed axial flow type gas laser using a Root's blower has been developed and utilized for laser working. In order to increase the output power with a small size laser device, it is necessary to increase the gas pressure of the laser medium. For obtaining a stable glow discharge with a high gas pressure, use is made of means for ejecting the laser medium through a nozzle or a slit with a high speed so as to expand it rapidly. This is described e.g. in JP-A-No. 49-122997, JP-A-No. 58-178579, JP-A-No. 60-70786 (corresponding to U.S. Pat. No. 4,622,675 ), etc.

In these prior art techniques using discharge in a high pressure gas there was a problem that laser output fluctuated, e.g. it varied. Fluctuations in laser output mean not only fluctuations of the magnitude of the laser output but also those in intensity distribution. Thus, a prior art laser device had a disadvantage that according to measurement results of the fluctuations by means of a beam analyzer the frequency of the fluctuations was comprised from several tens of Hz to several kHz where components at the neighborhood of 1 kHz were predominant; and that the laser output varied so strongly that the intensity of the fluctuations amounted to about 50% of that of the laser beam without fluctuations.

SUMMARY OF THE INVENTION

An object of this invention is to provide a gas laser device having a stable laser output.

In order to achieve this object, a gas laser device, according to this invention, has an expanded portion, which is part of the principal part of the discharge tube, expanded towards the gas inlet so that the gas inlet provided with an electrode protrudes in the expanded portion.

The gas medium ejected from each gas inlet in the principal portion of the discharge tube collides with the wall of the principal portion of the discharge tube while forming a flame from the electrode along the ejected gas medium and thus it is divided into two partial flows. The divided partial gas medium flows collide with the gas inlet. Consequently they do not collide with the gas medium within the gas inlet. Since the gas medium and the flame hardly fluctuate and they are stable, the laser output can be stabilized.

BRIEF DESCRIPTION OF THE DRAWINGS

FIGS. 4A to 4D are longitudinal cross-sectional views of the neighborhood of the expansion chamber in other embodiments of this invention.

DESCRIPTION OF THE PREFERRED EMBODIMENTS

Figure 1:
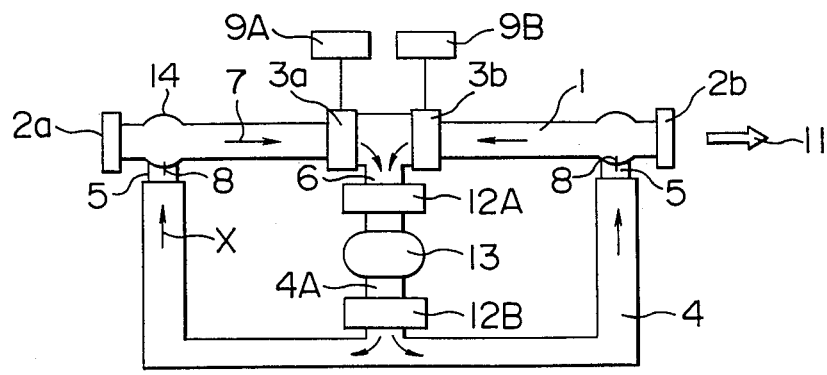
FIG. 1 is a schematical side view of a gas laser device, which is an embodiment of this invention.
Figure 2:
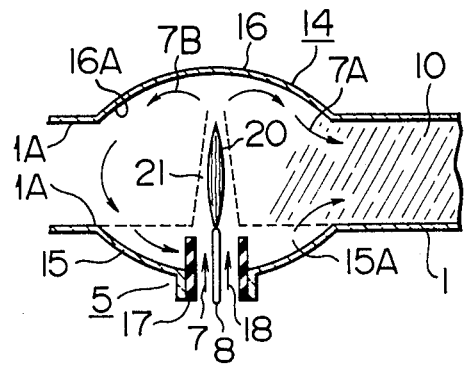
FIG. 2 is a longitudinal cross-sectional view of the neighborhood of the expansion chamber in FIG. 1.

Hereinbelow an embodiment of this invention will be explained, referring to FIGS. 1 and 2.

The principal portion of a discharge tube 1 has a reflecting mirror 2a and an output mirror 2b at its two ends and ring-shaped cathodes 3a, 3b are disposed at the central portion, which are opposed to the mirrors 2a, 2b. Both the ends and the central portion of the principal part of the discharge tube 1 are connected to a gas flow path 4. The gas flow path 4 forms the gas inlets 5 and the gas outlet 6. The gas medium 7, e.g. $CO_2$, $N_2$, He, flows in the direction indicated by an arrow X in the gas flow path. When voltages are applied from high voltage DC power sources 9A and 9B between the anodes 8 disposed at the gas inlets 5 and the cathodes 3a, 3b, electric power deposited in the gas medium 7 flowing through glow discharge domains 10 formed between the electrodes is transformed into a laser power in the beam 11. The laser beam 11 is taken out through the output mirror 2b. The gas medium 7 warmed in the flow discharge domains circulates again through the gas outlet 6 to the gas flow path 4. The gas medium 7 is cooled in a first heat exchanger 12A and sent by a blower 13, e.g. Root's blower to a second heat exchanger 12B. The first and the second heat exchanger 12A, 12B and the blower 13 are disposed on the central tube 4A of the gas flow path 4. The gas medium 7 cooled by the second heat exchanger 12B flows through the gas flow path 4 and is ejected through the gas inlet 5 in each of the expansion chambers 14.

Each of the expansion chambers 14 is an expanded portion of the principal portion of the discharge tube 1, which is formed in an ellipsoid expanded in the gas inflow direction and the direction opposite thereto. Each of the expansion chambers 14 consists of a lower expanded portion 15 near the gas inlet and an upper expanded portion 16, which is opposite thereto. The two expanded portions are so formed that they are symmetric with respect to the axis of the principal portion of the discharge tube 1. The lower expanded portion 15 is expanded outward from the inner surface 1A of the principal portion of the discharge tube, i.e. it protrudes outward. A nozzle 17 is inserted in the gas inlet 5 in the lower expanded portion 15. Within the nozzle 17 is formed a hole 18, which is connected with the gas flow path 4. Within the hole 18 is disposed a rod-shaped anode 8. The lower end of the anode 8 is bent in an L-shape and the anode is mounted on the inner surface of the nozzle 17 or the gas flow path. The nozzle 17 and the anode 8 protrude partly into the lower expanded portion.

The size of the protrusion of the nozzle 17 and that of the anode 8 are so chosen that no parts of the nozzle 17 and the anode 8 protrude beyond the inner surface $1a$ of the principal portion of the discharge tube therein, i.e. in the laser beam path. The extremity or end of the anode is disposed usually nearer to the inner surface of the principal portion of the discharge tube than the extremity or end of the nozzle 17. However the anode may be so formed that its extremity is at the same height as the extremity of the nozzle 17.

Next, the gas medium 7 in the hole or aperture 18 is ejected in the expansion chamber 14. The ejected gas medium 7 elongates upward the ignited flame 20 on the anode 8 and forms it in a shape similar to that of a flame of candle. At the same time the ejected gas medium 7 forms a potential core 21, whose diameter becomes smaller with increasing distance from the nozzle 17 to the ceiling surface 16A of the upper expanded portion 16. Then, the ejected gas medium 7 collides with the ceiling surface 16A and is divided into two partial flows of different directions. One 7A of the partial flows of the gas medium flows to the glow discharge domain and the other 7B circulates along the inner surface of the expansion chamber, then collides with the nozzle 17 along the inner surface of the lower expanded portion 15, flows around the nozzle 17 and finally flows to the glow discharge domain 10. As the result, only a small portion of the partial flows 7B of the gas medium collides with the gas medium 7 or the potential core 21 in the lower expanded portion. Since the gas medium 7 or the potential core 21 do not fluctuate much, the flame 20 also does not fluctuate. Thus, it is slender and long and it elongates straight. Consequently the glow discharge domain 10 also does not oscillate and is stable. Therefore the laser beam 11 emitted through the output mirror 2b fluctuates only slightly and its output power is always stable. The inventors of this invention have observed that the fluctuations of the laser beam were reduced to about 1/10 according to this invention with respect to those observed according to the prior art techniques.

When the extremity of the anode 8 and that of the nozzle 17 are located at the same level as or lower than the inner surface 1A of the principal portion of the discharge tube, they do not hinder the laser beam path and consequently they do not decrease the laser output power.

In particular, when the extremity of the anode 8 is located nearer to the inner surface of the principal portion of the discharge tube than the extremity of the nozzle 17, a part of the glow discharge domain 10 touches hardly the extremity of the nozzle 17 and the extremity of the nozzle is hardly destructed thermally. In this way the life of the nozzle 17 is elongated and at the same time the part of the glow discharge domain 10 near the extremity of the anode 8 is stabilized and the laser output power can be increased.

Next the relation between the geometry of the extremity of the anode 8 and the nozzle 17 and fluctuations of the laser output power will be explained below, referring to FIGS. 3A and 3B.

Figure 3A:
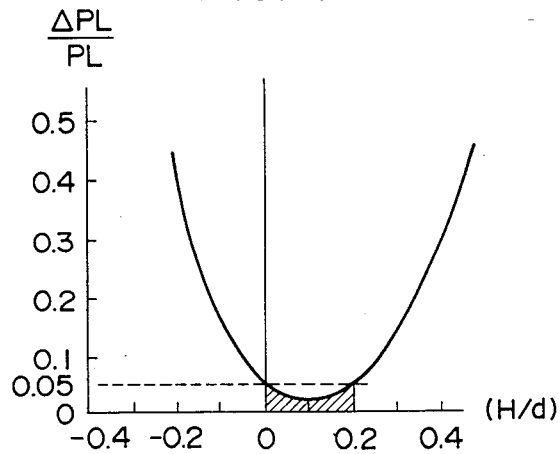
FIGS. 3A and 3B are a characteristic curve representing variations of the laser beam according to this invention and a longitudinal cross-sectional view of the anode, respectively.
Figure 3B:
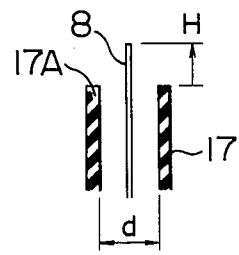

The abscissa in FIG. 3A represents the ratio of the distance H between the extremity of the anode 8 and the extremity surface 17A of the nozzle 17 to the diameter d of the nozzle as indicated in FIG. 3B, which distance is increased successively. The ordinate indicates the ratio $\Delta P_L/P_L$ of fluctuations $\Delta P_L$ of the laser beam to the average output power $P_L$ of the laser beam. Taking the relation between H/d and $\Delta P_L/P_L$ into account, it can be understood that it is desirable that H/d satisfies the following condition;

$$0 < H/d < 0.2 \quad (1)$$

This reason is as follows. When H/d is greater than 0.2, the ejected gas medium is subjected to bad influences of the partial gas medium flow 7B and $\Delta P_L/P_L$ becomes greater than 0.5 such that fluctuations are large. When a workpiece is worked, e.g. cut, with a laser beam, whose output fluctuates considerably, the cut-off surface of the workpiece is uneven and the worked piece cannot be usable. Further, when H/d is smaller than 0, i.e. the anode 8 does not protrude beyond the extremity of the nozzle, but it is located entirely within the nozzle, a part of the glow discharge produced at the anode 8 may be brought into contact with nozzle and the glow discharge fluctuates. As the result the output power of the laser beam becomes unstable and the nozzle may be destructed thermally.

Other embodiments of this invention will be explained below, referring to FIGS. 4A to 4D.

In the device indicated in FIG. 4A, another nozzle 17A is disposed outside of the nozzle 17 so that a cylindrical hole 18A is formed between the nozzles 17 and 17A. In this way the total cross-section of the holes 18 and 18A can be increased and thus it is possible to reduce the whole pressure loss in the gas inlet 5. Consequently the gas flow rate and the output power of the laser beam can be increased. Further, at the same time, since the gas medium coming from the peripheral hole flows, surrounding the potential core 21, what has an effect that the potential core is hardly disturbed.

In the device indicated in FIG. 4B the expanded portion 15 protruding outward is formed only at the neighborhood of the gas inlet 5 of the principal portion of the gas discharge tube 1. In the device indicated in FIG. 4C the expansion chamber 14A is a rectangular parallelepiped. In the device indicated in FIG. 4D the anode 8 is disposed outside of the nozzle and extended to the vicinity of the central axis of the cylindrical hole 18. In any case an effect similar to that described above can be achieved. Thus, the object of this invention can be achieved by disposing any expanded portion at least on the gas inlet side of the expansion chamber, but a greater effect can be obtained, if the expansion chamber is a sphere, an oval or an ellipsoid, which is symmetric with respect to the central axis of the discharge tube. Further it is a cylindrical nozzle that has most excellent characteristics, but a tapered inner or outer periphery has an effect and its cross-sectional form may be other than a circle.

Furthermore, the nozzle 17 may protrude beyond the inner surface of the principal portion of the discharge tube in such an extent that it does not hinder the laser beam path. In this case it is desirable that the inner diameter of the principal portion of the discharge tube at the neighborhood of the nozzle is greater than that at the glow discharge domain.

As explained above, the gas laser device according to this invention can stabilize the laser output power.

We claim:

1. A gas laser device including a discharge tube having a main tube portion of a predetermined inner diameter and a pair of end portions, a mirror disposed at each end portion to form a cavity in the discharge tube, gas inlet means and gas outlet means coupled to the discharge tube for enabling flow of the gas medium through the discharge tube, and at least one pair of electrodes disposed in the discharge tube, the at least one pair of electrodes having a voltage applied therebetween so as to enable generation of a glow discharge between the electrodes and to excite the gas medium flowing through the gas inlet means to the gas outlet means by the glow discharge, thereby enabling a laser beam to be generated, each of the end portions of the discharge tube including an expanded portion having an inner diameter greater than the predetermined inner diameter of the main tube portion, the expanded portion having the gas inlet means disposed thereat, the gas inlet means including a gas inlet nozzle having a portion protruding within the expanded portion of the discharge tube to an extent less than the predetermined inner diameter of the main tube portion of the discharge tube, and one of the electrodes of the at least one pair of electrodes being disposed within the gas inlet nozzle.

2. A gas laser device according to claim 1, wherein the expanded portion of the discharge tube is provided at a lower portion of the discharge tube.

3. A gas laser device according to claim 1, wherein the one of the electrodes disposed within the gas inlet nozzle has a portion protruding within the expanded portion of the discharge tube beyond the protruding portion of the gas inlet nozzle.

4. A gas laser device according to claim 1, wherein the expanded portion of the discharge tube is a semi-ellipsoid.

5. A gas laser device according to claim 1, wherein the expanded portion of the discharge tube delimits an expansion chamber of the discharge tube, the expansion portion including one expanded part at a lower surface of the discharge tube and another expanded part at an upper surface of the discharge tube, the gas inlet means being disposed at the one expanded part, and the expansion chamber being an ellipsoid.

6. A gas laser device according to claim 1, wherein the one of the electrodes disposed within the gas inlet nozzle protrudes within the expanded portion of the discharge tube beyond the protruding portion of the gas inlet nozzle by a height H, and the gas inlet nozzle has an inner diameter d so as to satisfy the following condition:

$0 < H/d < 0.2.$

7. A gas laser device according to claim 6, wherein the gas inlet means having the gas inlet nozzle and the one of the electrodes disposed therein is disposed at a lower portion of the discharge tube.

8. A gas laser device according to claim 6, wherein the expanded portion of the discharge tube is a semi-ellipsoid.

9. A gas laser device according to claim 6, wherein the expanded portion of the discharge tube delimits an expansion chamber of the discharge tube, the expansion portion including one expanded part at a lower surface of the discharge tube and another expanded part at an upper surface of the discharge tube, the gas inlet means being disposed at the one expanded part, and the expansion chamber being an ellipsoid.

* * * * *